US011375791B2

(12) United States Patent
Maravilla et al.

(10) Patent No.: US 11,375,791 B2
(45) Date of Patent: Jul. 5, 2022

(54) WIRELESS CHARGING LUGGAGE SYSTEM

(71) Applicant: Exxel Outdoors, LLC, Boulder, CO (US)

(72) Inventors: Daniel John Maravilla, Thousand Oaks, CA (US); Anthony Trent Valladares, Thousand Oaks, CA (US)

(73) Assignee: Exxel Outdoors, LLC, Broomfield, CO (US)

( * ) Notice: Subject to any disclaimer, the term of this patent is extended or adjusted under 35 U.S.C. 154(b) by 225 days.

(21) Appl. No.: 16/704,702

(22) Filed: Dec. 5, 2019

(65) Prior Publication Data
US 2021/0169192 A1 Jun. 10, 2021

(51) Int. Cl.
*H02J 7/00* (2006.01)
*A45C 15/00* (2006.01)
*A45C 5/03* (2006.01)
*A45C 13/04* (2006.01)
*H02J 50/00* (2016.01)

(52) U.S. Cl.
CPC ............. *A45C 15/00* (2013.01); *A45C 5/03* (2013.01); *A45C 13/04* (2013.01); *H02J 7/0045* (2013.01); *H02J 7/0047* (2013.01); *H02J 50/00* (2016.02); *A45C 2005/037* (2013.01)

(58) Field of Classification Search
USPC .......................... 320/104, 105, 106, 107, 108
See application file for complete search history.

(56) References Cited

U.S. PATENT DOCUMENTS

| | | | | |
|---|---|---|---|---|
| 2015/0326044 A1* | 11/2015 | Ashley | ................... | H02J 7/342 320/103 |
| 2017/0188679 A1* | 7/2017 | Jacob | ....................... | A45C 5/03 |
| 2017/0290401 A1* | 10/2017 | Bhatnagar | ................ | A45C 5/14 |
| 2018/0116361 A1* | 5/2018 | Anjum | .................... | A45C 15/06 |
| 2018/0184777 A1* | 7/2018 | Hong | ........................ | A45C 5/06 |
| 2019/0045897 A1* | 2/2019 | Bhatnagar | ............. | H02J 7/0045 |
| 2019/0214839 A1* | 7/2019 | Goldner | .................. | H02J 7/342 |
| 2020/0085159 A1* | 3/2020 | Tang | .................... | G05D 1/0088 |

FOREIGN PATENT DOCUMENTS

| | | | |
|---|---|---|---|
| CN | 205757875 | * 12/2016 | |
| CN | 209862574 | * 12/2019 | |
| WO | WO-2019162631 A1 | * 8/2019 | ............ A45C 13/42 |

* cited by examiner

*Primary Examiner* — Brian Ngo
(74) *Attorney, Agent, or Firm* — Stinson LLP (57) ABSTRACT

A luggage system includes a housing assembly defining one or more luggage compartments therein. The housing assembly has a first outer surface that defines a seat. A frame assembly is positionable at or adjacent to the seat to couple the frame assembly to the housing assembly. The frame assembly defines a slot therein. The frame assembly has a frame surface that defines a charging pad. The charging pad faces an upward direction when the frame assembly is coupled to the housing assembly. A power bank is insertable into the slot for wirelessly charging one or more electronic devices positioned at or adjacent to the charging pad. The luggage system enables one or more power banks or batteries to be transported in an effective, convenient, and safe manner.

20 Claims, 7 Drawing Sheets

WIRELESS CHARGING LUGGAGE SYSTEM

BACKGROUND

At least some travelers may carry one or more electronic devices while travelling. Charging such electronic devices while travelling may be stressful and/or onerous. At least some travelers may carry one or more batteries to charge their electronic devices when trusted charging facilities are not conveniently available. However, at least some batteries (e.g., lithium batteries) may be restricted or prohibited from certain forms of travel, and staying abreast of all the travel regulations regarding electronic devices and/or batteries may be difficult and/or time-consuming.

SUMMARY

Examples of the disclosure enable one or more batteries to be transported in an effective, convenient, and safe manner. In one aspect, a luggage system is provided. The luggage system includes a housing assembly defining one or more luggage compartments therein. The housing assembly has a first outer surface that defines a seat. A frame assembly is positionable at or adjacent to the seat to couple the frame assembly to the housing assembly. The frame assembly defines a slot therein. The frame assembly has a frame surface that defines a charging pad. The charging pad faces an upward direction when the frame assembly is coupled to the housing assembly. A power bank is insertable into the slot for wirelessly charging one or more electronic devices positioned at or adjacent to the charging pad.

In another aspect, a frame assembly is provided for use with a housing assembly. The frame assembly includes a chassis extendable over a seat defined at an upper surface of the housing assembly, and a cover extendable over the chassis. The chassis includes a base wall, a side wall, and an end wall that define a slot in which a power bank is positionable. The cover has a frame surface defining a charging pad that faces an upward direction. One or more electronic devices are positionable on the charging pad for wirelessly charging the one or more electronic devices.

In yet another aspect, a method is provided for using a luggage system. The method includes coupling a frame assembly to a housing assembly defining one or more luggage compartments therein. The frame assembly includes a cover that includes a door moveable between an open configuration and a closed configuration. The method further includes moving the door toward the open configuration, inserting a battery into a slot defined in the frame assembly, and positioning one or more electronic devices on a charging pad defined at an outer surface of the cover for wirelessly charging the one or more electronic devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The figures and associated descriptions are provided to illustrate examples of the disclosure and not to limit the scope of the disclosure. The figures are in simplified form and are not necessarily to scale. Throughout the figures and associated descriptions, reference characters are used to indicate correspondence between referenced elements. In regard to the disclosure herein, directional terms, such as upper, lower, front, rear, left, right, and the like, are used with respect to the accompanying figures for purposes of convenience and clarity only. Such directional terms are not to be construed as limiting the scope of the disclosure in any manner.

DETAILED DESCRIPTION

The subject matter described herein relates generally to luggage systems and, more specifically, to a wireless charging luggage system. Examples of the disclosure may be used to carry and/or use one or more power banks or batteries while travelling for use in charging one or more electronic devices. The electronic devices may be charged using one or more wireless charging technologies. The examples described herein include a housing assembly defining one or more luggage compartments therein, and a frame assembly defining a slot therein for receiving a battery. The battery may be removed from the slot, for example, to comply with travel regulations restricting batteries from checked baggage. The frame assembly is coupleable to the housing assembly at or adjacent to an upper surface of the housing assembly. The frame assembly may be spaced from a handle assembly, for example, to increase accessibility.

Figure 1:
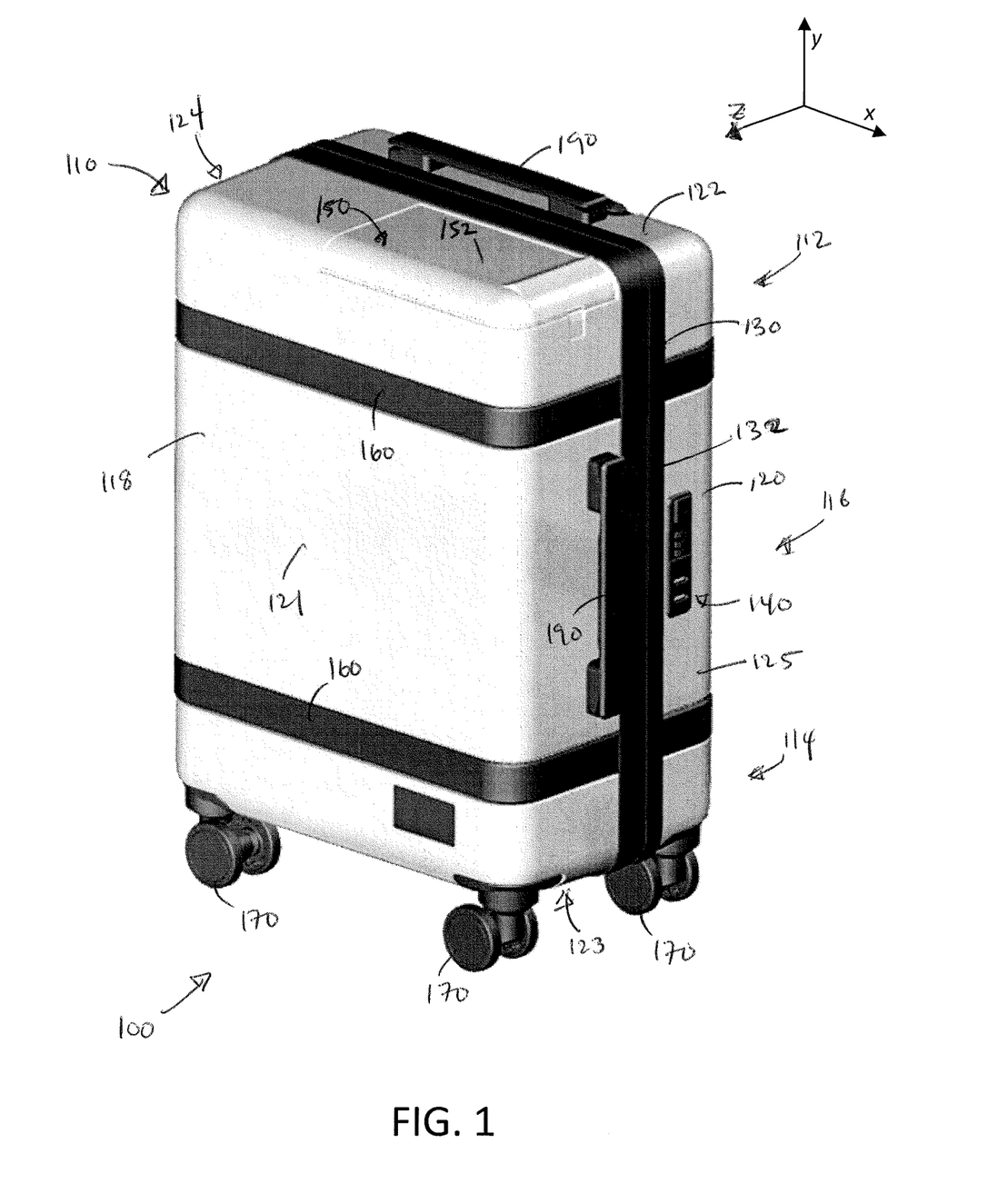
FIG. 1 is a front perspective view of an example luggage system including an example housing assembly and an example frame assembly.
Figure 2:
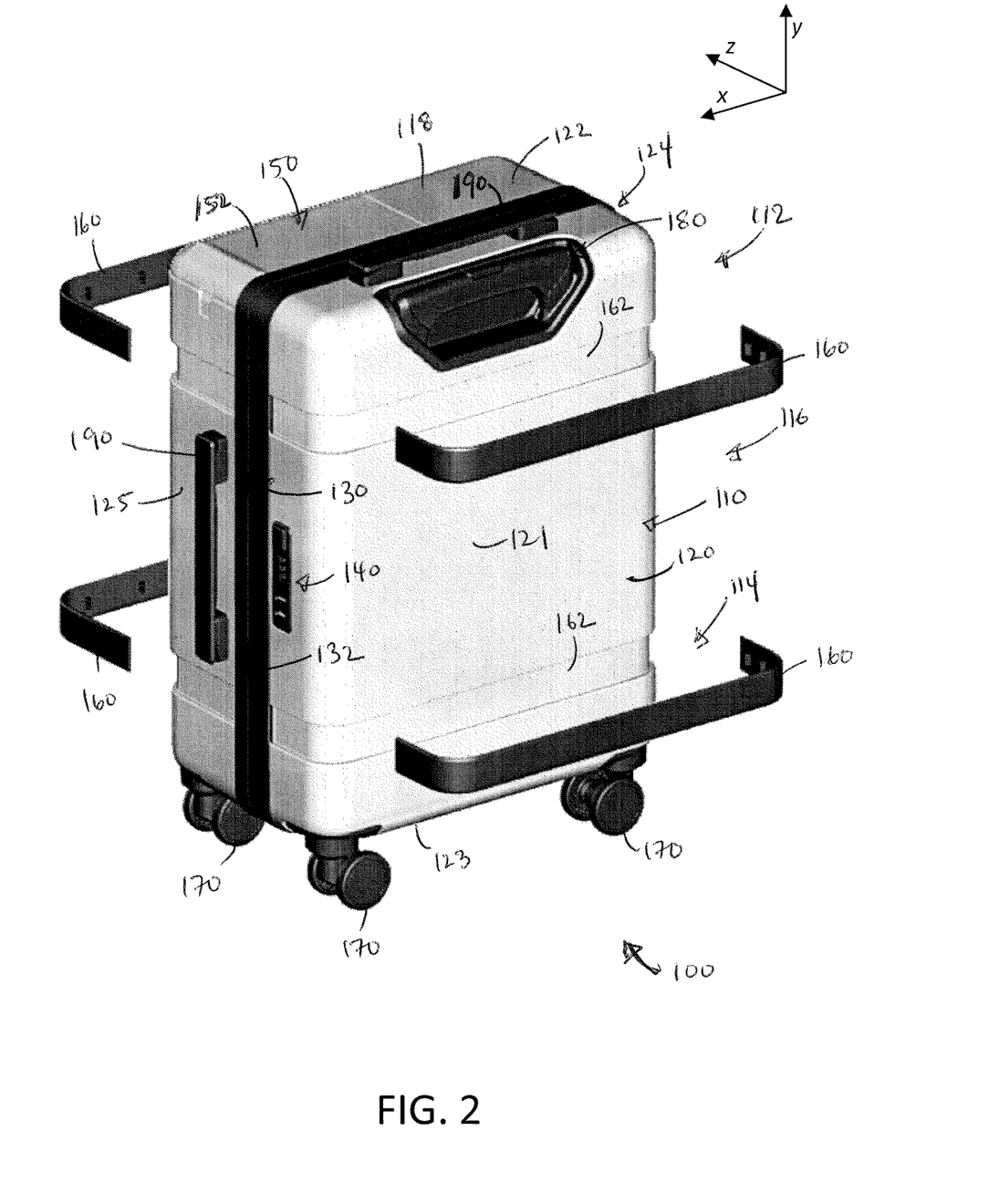
FIG. 2 is an exploded rear perspective view of the luggage system shown in FIG. 1.

FIGS. 1 and 2 show an example luggage system 100 including a housing assembly 110 for storing clothing and/or other items therein. The luggage system 100 may be used to transport the clothing and/or other items stored in the housing assembly 110. The housing assembly 110 is shown in FIGS. 1 and 2 as including an upper portion 112, a lower portion 114 opposite the upper portion 112, and a body portion 116 extending between the upper portion 112 and the lower portion 114. The luggage system 100 is shown in an upright position for purposes of convenience and clarity only. That is, the luggage system 100 may be moved (e.g., translated, rotated) to be in any position other than the upright position and structurally remain the same or substantially unchanged.

The housing assembly 110 is fabricated from one or more materials. In some examples, the housing assembly 110 is a hard-shell case including a front shell 118 and a rear shell 120 that define one or more cavities or luggage compartments therebetween. For example, the housing assembly 110 may include a thermoplastic material that is robust, lightweight, transparent or translucent, impact-resistant, and/or temperature-resilient, such as a Makrolon® polycarbonate material (MAKROLON is a registered trademark of Covestro Deutschland AG). Alternatively, the housing assembly 110 may be fabricated from any combination of materials that enables the luggage system 100 to function as described herein.

The front shell 118 and rear shell 120 may each include a main wall 121 (i.e., a front wall and a rear wall, respectively), an upper wall 122 at an upper longitudinal end of the main wall 121, a lower wall 123 at a lower longitudinal end of the main wall 121, a left wall 124 at a left lateral side of the main wall 121, and a right wall 125 at a right lateral side of the main wall 121. In some examples, the upper wall 122, lower wall 123, left wall 124, and/or right wall 125 extends generally perpendicular to the corresponding main wall 121 (i.e., front wall or rear wall), and the main walls 121 extend generally parallel to each other when the housing assembly 110 is in a closed configuration. For example, as shown in FIGS. 1 and 2, the main wall 121 of the front shell 118 may have an outer surface (i.e., a front surface) that generally faces a positive direction along the Z-axis (i.e., forward), the main wall 121 of the rear shell 120 may have an outer surface (i.e., a rear surface) that generally faces a negative direction along the Z-axis (i.e., rearward), the upper walls 122 may each have an outer surface (i.e., an upper surface) that generally faces a positive direction along the Y-axis (i.e., upward), the lower walls 123 may each have an outer surface (i.e., a lower surface) that generally faces a negative direction along the Y-axis (i.e., downward), the left walls 124 may each have an outer surface (i.e., a left surface) that generally faces a negative direction along the X-axis (i.e., leftward), and the right walls 125 may each have an outer surface (i.e., a right surface) that generally faces a positive direction along the X-axis (i.e., rightward). Alternatively, the housing assembly 110 may have any configuration that enables the luggage system 100 to function as described herein.

The housing assembly 110 includes one or more coupling mechanisms 130 that couple at least a section of the front shell 118 to a section of the rear shell 120. The coupling mechanisms 130 may be at or adjacent to an interface 132 between the front shell 118 and rear shell 120 extending generally along the upper portion 112, lower portion 114, and body portion 116 of the housing assembly 110 between the upper walls 122, lower walls 123, left walls 124, and/or right walls 125 of the front shell 118 and rear shell 120. For example, as shown in FIG. 1, the coupling mechanisms 130 may include a zipper that extends generally between the upper walls 122, lower walls 123, and right walls 125 of the front shell 118 and rear shell 120 when the housing assembly 110 is in the closed configuration. In some examples, the front shell 118 is hingably coupled to the rear shell 120 at the left walls 124 of the front shell 118 and rear shell 120 (e.g., using a hinge) such that the housing assembly 110 is moveable between the closed configuration and an open configuration. Alternatively, the coupling mechanisms 130 may include any combination of fasteners (e.g., buttons, snaps, hook-and-loop fasteners) that enables the housing assembly 110 to function as described herein.

The zipper may be moved along the upper portion 112, lower portion 114, and/or body portion 116 between an engaged or zipped configuration and a disengaged or unzipped configuration. When the zipper is in the zipped configuration, the housing assembly 110 is in the closed configuration, in which the upper walls 122, lower walls 123, left walls 124, and right walls 125 of the front shell 118 and rear shell 120 are coupled to each other. Conversely, when the zipper is in the unzipped configuration, the housing assembly 110 may be free to move between the closed configuration and an open configuration, in which at least a section of the front shell 118 (e.g., upper wall 122, lower wall 123, and/or right wall 125) is uncoupled and/or spaced from a section of the rear shell 120 (e.g., upper wall 122, lower wall 123, and/or right wall 125, respectively).

In some examples, the housing assembly 110 includes a securing mechanism 140 that allows the housing assembly 110 to be maintained or secured in the closed configuration. As shown in FIG. 1, the securing mechanism 140 may be at the right walls 125 of the front shell 118 and rear shell 120 (e.g., opposite the hinge) at or adjacent to the interface 132. In some examples, the securing mechanism 140 includes a Transportation Security Administration (TSA)-approved combination lock including a first engaging element coupled to the front shell 118 and a second engaging element coupled to the rear shell 120. The first engaging element and/or second engaging element may be moved, for example, between an engaged or secured configuration and a disengaged or unsecured configuration. When the first engaging element and second engaging element are in the secured configuration while the housing assembly 110 is in the closed configuration, the securing mechanism 140 restricts or prevents the housing assembly 110 from moving toward the open configuration. Conversely, when the first engaging element and/or second engaging element are in the unsecured configuration, the housing assembly 110 may be free to move toward the open configuration. Alternatively, the securing mechanism 140 may include any combination of elements that enables the housing assembly 110 to function as described herein.

The securing mechanism 140 and the coupling mechanisms 130 are operable or usable independent of each other. That is, the coupling mechanisms 130 may be moved between the secured configuration and unsecured configuration while the securing mechanism 140 is in either the secured configuration or the unsecured configuration, and the securing mechanism 140 may be moved between the secured configuration and unsecured configuration while the coupling mechanisms 130 are in either the secured configuration or the unsecured configuration.

A frame assembly 150 is coupled to the upper portion 112 of the housing assembly 110. The frame assembly 150 has an upper surface 152 (e.g., a "frame surface") generally facing upwardly. The upper surface 152 defines a charging pad upon which one or more electronic devices may be wirelessly charged. In some examples, at least a portion of the upper surface 152 is textured or knurled to increase a coefficient of friction thereof. As shown in FIGS. 1 and 2, the upper surface 152 may be at an elevation that is the same as or substantially similar to an upper elevation of the housing assembly 110 (e.g., at the upper surface of an upper wall 122).

As shown in FIGS. 1 and 2, the luggage system 100 may include one or more bands 160 extending generally horizontally (e.g., along the X-axis and/or the Z-axis) about the housing assembly 110. The bands 160 are extendable, for example, in one or more grooves 162 (shown in FIG. 2) defined by an outer surface of the main walls 121 (e.g., front wall, rear wall), left walls 124, and/or right walls 125. The grooves 162 may face a direction generally perpendicular to the direction that the upper surface 152 faces (e.g., the upward direction). The bands 160 may be used to protect an outer surface of the housing assembly 110. For example, the bands 160 may have a height that is greater than a depth of the grooves 162. The bands 160 may also be used to visually distinguish the luggage system 100 from other luggage systems. The bands 160 may be selected, for example, based on a color, a pattern, and the like. In some examples, the bands 160 are removably coupled to the housing assembly 110.

In some examples, a plurality of wheels 170 and a trolley handle 180 (shown in FIG. 2) are coupled to the lower portion 114 and upper portion 112 of the housing assembly 110, respectively, for use in maneuvering or controlling the luggage system 100. The wheels 170 are configured to rotate smoothly and/or quietly about a horizontal axis in the X-Z plane and/or spin freely about a vertical axis along the Y-axis. In some examples, the wheels 170 are or include a set of Hinomoto® Lisof™ silent run double wheels at or adjacent to the corners of the lower portion 114 of the housing assembly 110 (HINOMOTO and LISOF are trademarks of Hinomoto Jomae, Ltd.). The trolley handle 180 is telescopically moveable between a contracted configuration and an extended configuration. The trolley handle 180 may be extended vertically (e.g., along the Y-axis), for example, relative to the housing assembly 110. In some examples, the trolley handle 180 has a release mechanism that controls or restricts movement of the trolley handle 180. Additionally, the luggage system 100 may include one or more grab handles 190 coupled to the front shell 118 and/or rear shell 120.

Figure 3:
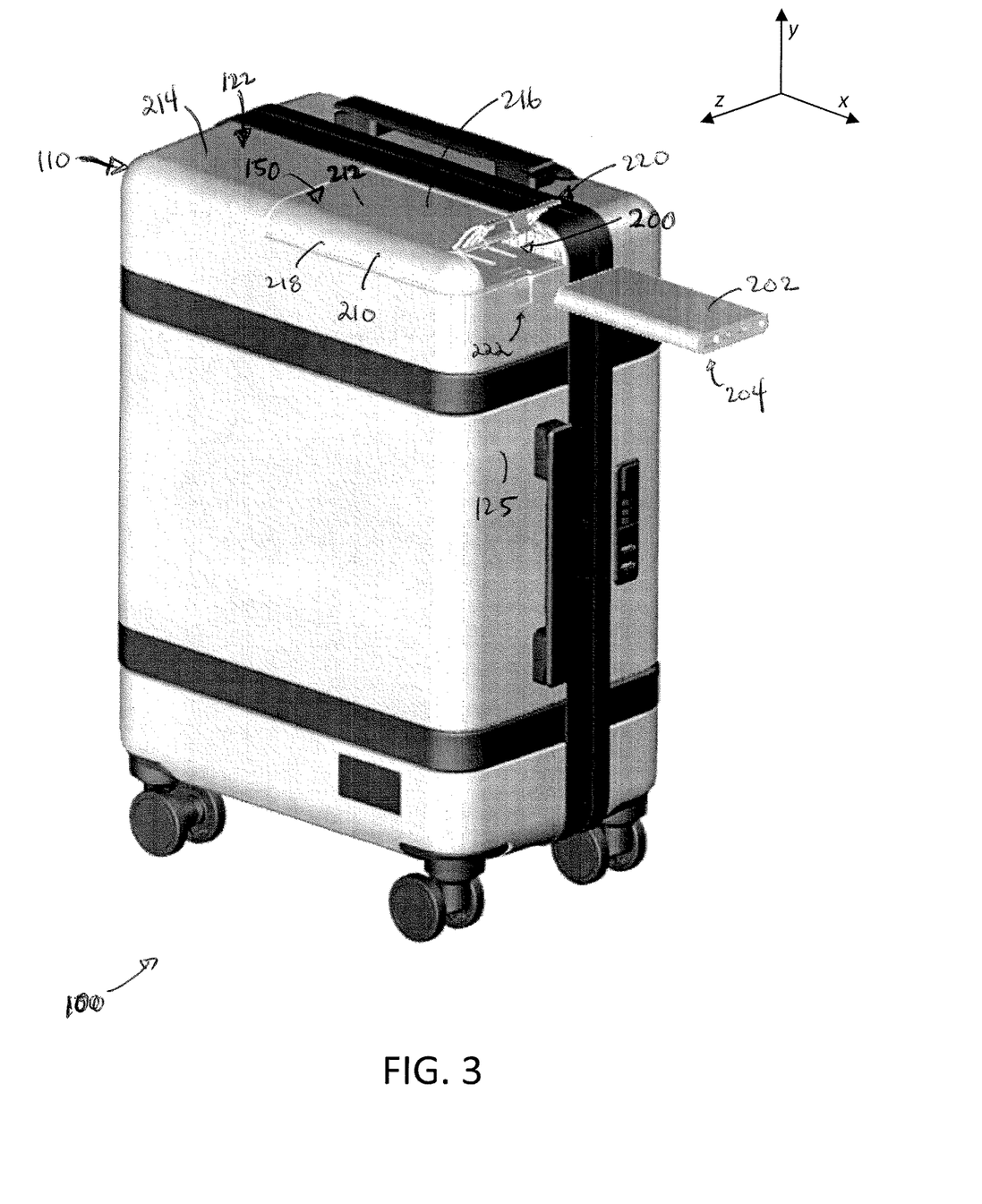
FIG. 3 is a front perspective view of the luggage system, with the frame assembly in an open configuration.

FIG. 3 shows the luggage system 100, with the frame assembly 150 in an open configuration. As shown in FIG. 3, the frame assembly 150 defines a slot 200 in which a power bank or battery 202 may be releasably and/or slidably retained. The battery 202 may have one or more ports (e.g., USB-type port) and one or more charge status indicators at a proximal end 204 of the battery 202 such that they are accessible when the battery 202 is in the slot 200. The ports may be used, for example, to charge the battery 202 and/or to power or charge one or more electronic devices coupled to the battery 202. In some examples, the battery 202 is configured to wirelessly charge one or more electronic devices positioned adjacent to the battery 202 using magnetic resonance, magnetic induction, and/or radio frequency (RF) energy harvesting technology.

The frame assembly 150 includes a cover 210 having an outer surface 212 (e.g., upper surface 152) defining a charging pad generally facing upwardly. An electronic device may be wirelessly charged when positioned at or adjacent to the charging pad. The outer surface 212 of the cover 210 may generally match or correspond with an outer surface 214 of the upper wall 122 such that a transition between the frame assembly 150 and the housing assembly 110 is generally seamless. For example, as shown in FIG. 3, the outer surface 212 of the cover 210 may have a profile and/or be at an elevation that is the same as or substantially similar to a profile and/or elevation of the housing assembly 110 (e.g., at the upper surface of an upper wall 122).

In some examples, the cover 210 includes a generally planar base wall 216 and an arcuate side wall 218 extending from the base wall 216. The outer surface 212 of the base wall 216 may be knurled or textured to facilitate maintaining one or more electronic devices thereon. The cover 210 may be directly coupleable to the upper portion 112 of the housing assembly 110 using one or more coupling mechanisms. The coupling mechanisms may extend, for example, generally downwardly from a lower portion of the side wall 218 and/or through one or more openings defined in the upper wall 122.

In some examples, the cover 210 includes a door 220 hingably coupled to the base wall 216 at the proximal end of the base wall 216 to control access to the slot 200. The door 220 is moveable, for example, between a closed configuration (shown, e.g., in FIG. 1), in which access to the slot 200 is restricted, and an open configuration (shown in FIG. 3), in which access to the slot 200 is allowed. As shown in FIG. 3, a notch 222 may be defined at the upper edge of the right wall 125. The notch 222 may allow a user's finger to be more easily positioned at least partially beneath the door 220 for moving the door 220 toward the open configuration. In some examples, the door 220 is biased toward the closed configuration.

Figure 4:
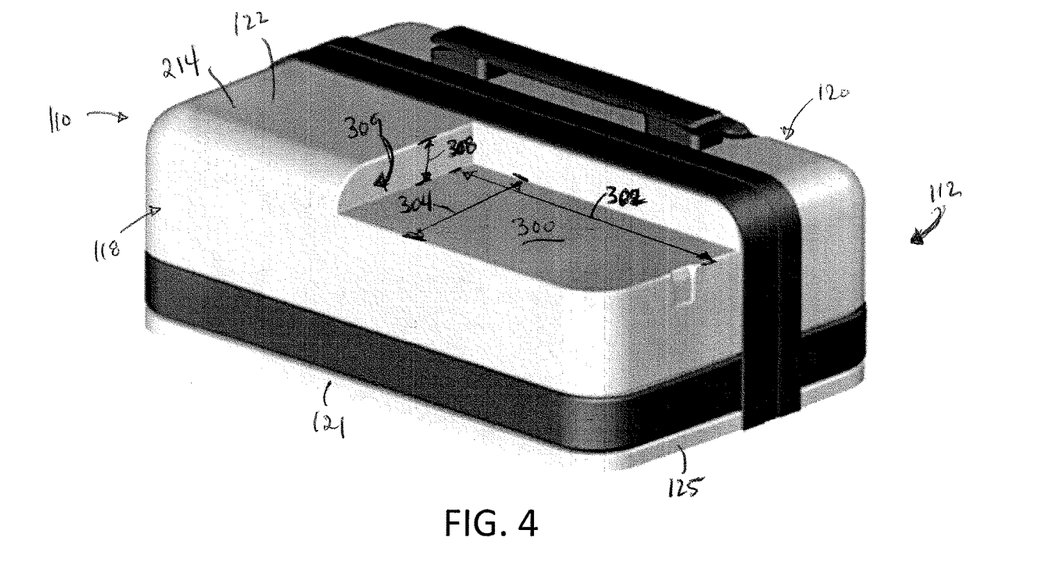
FIG. 4 is a section view of an upper portion of the housing assembly shown in FIG. 1.

FIG. 4 shows the upper portion 112 of the housing assembly 110. In some examples, the upper wall 122 of the front shell 118 and/or rear shell 120 has a first outer surface defining a seat 300 generally facing upwardly. The seat 300 may extend over or span a substantially planar area having a length 302 from an upper edge of the right wall 125 and a width 304 from an upper edge of the main wall 121. As shown in FIG. 4, the seat 300 may be depressed (i.e., at a lower elevation) relative to a second outer surface of the upper wall 122 (e.g., outer surface 214) such that the seat 300 has a depth 308 at a riser portion 309 of the upper wall 122. Alternatively, the seat 300 may be at any other location that enables the luggage system 100 to function as described herein. In some examples, the notch 222 is defined in the first outer surface of the upper wall 122 at one end of the seat 300. The notch 222 may be, for example, at a proximal end of the upper wall 122 at the upper edge of the right wall 125.

Figure 5:
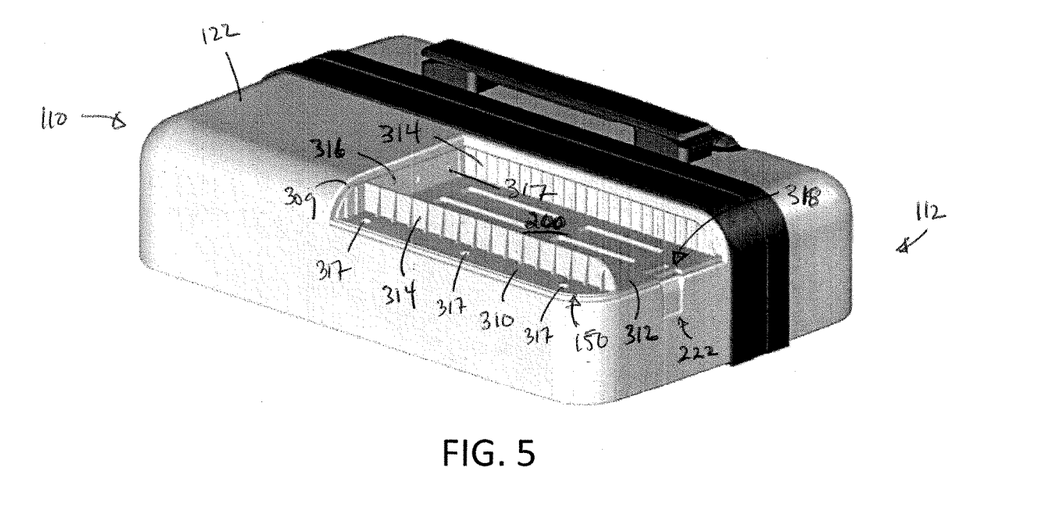
FIG. 5 is a section view of the upper portion shown in FIG. 4 with an example chassis of the frame assembly shown in FIG. 1.

The frame assembly 150 is positionable at or adjacent to the seat 300 to couple the frame assembly 150 to the housing assembly 110. FIG. 5 shows the upper portion 112 of the housing assembly 110 coupled to a chassis 310 of the frame assembly 150. As shown in FIG. 5, the chassis 310 may be extended directly over the seat 300. The chassis 310 includes a base wall 312 and a side wall 314 and/or end wall 316 extending generally perpendicular to the base wall 312. The chassis 310 may be positioned directly on the seat 300 such that the end wall 316 is at or adjacent to the riser portion 309 of the upper wall 122. In some examples, the chassis 310 is coupled to the upper wall 122 using one or more coupling mechanisms. The coupling mechanisms may be extended, for example, through one or more openings 317 defined in the base wall 312, side wall 314, and/or end wall 316. In some examples, a cutout 318 is defined in the chassis 310 at one end (e.g., a proximal end) of the base wall 312. The chassis 310 may be oriented such that the cutout 318 is aligned with the notch 222. As shown in FIG. 5, the base wall 312, side wall 314, and/or end wall 316 may define the slot 200. In some examples, the cover 210 is extendable over the chassis 310 at the seat 300 to provide a surface (e.g., outer surface 262) on which one or more electronic devices may be positioned.

Figure 6:
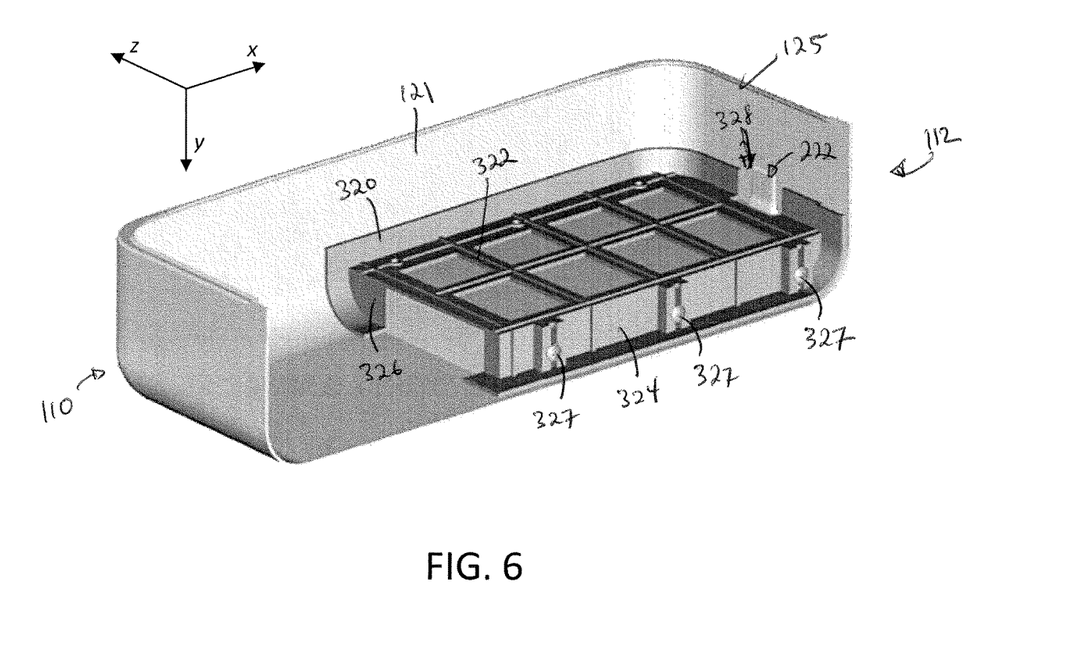
FIG. 6 is a section view of an underside of the upper portion shown in FIG. 5 with an example support of the frame assembly shown in FIG. 1.

FIG. 6 shows an underside or lower surface of the upper portion 112 of the housing assembly 110 coupled to a support 320 of the frame assembly 150. As shown in FIG. 6, the support 320 may be extended directly under the seat 300. The support 320 includes a base wall 322 and a side wall 324 and/or end wall 326 extending generally perpendicular to the base wall 322. The support 320 may be positioned directly under the seat 300 such that the end wall 326 is at or adjacent to the riser portion 309 of the upper wall 122. In some examples, the support 320 is coupled to the upper wall 122 using one or more coupling mechanisms 327. The coupling mechanisms 327 may be extended, for example, through one or more openings defined in the base wall 322, side wall 324, and/or end wall 326. In some examples, a cutout 328 is defined in the support 320 at one end (e.g., a proximal end) of the base wall 322. The support 320 may be oriented such that the cutout 328 is aligned with the notch 222.

Figure 7:
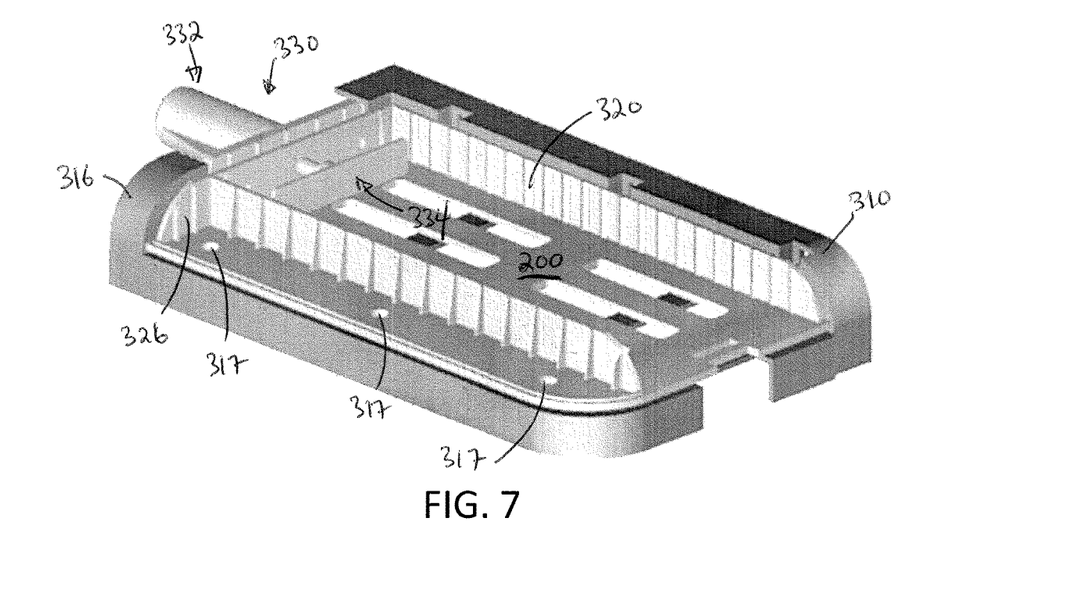
FIG. 7 is a perspective view of the chassis shown in FIG. 5, the support shown in FIG. 6, and an example eject mechanism of the frame assembly shown in FIG. 1.

FIG. 7 shows the chassis 310 and support 320 with an eject mechanism 330. As shown in FIG. 7, the eject mechanism 330 may be positioned at a distal end of the chassis 310 and/or support 320. In some examples, the eject mechanism 330 extends through one or more openings defined in the end wall 316 and/or end wall 326. The eject mechanism 330 may be moved between a retracted configuration and an extended configuration. The eject mechanism 330 may include, for example, a stationary portion 332 and a moving portion 334 that is moveable relative to the stationary portion 332. When the eject mechanism 330 is in the retracted configuration, the battery 202 (shown in FIG. 3) may be positioned entirely within the slot 200. Conversely, when the eject mechanism 330 is in the extended configuration, the battery 202 may be at least partially ejected from the slot 200. In some examples, the eject mechanism 330 is a "push-to-insert, push-to-eject and pull-to-extract" mechanism. For example, the moving portion 334 may be configured to remain stationary (e.g., until an external force is applied) when the eject mechanism 330 is in the retracted configuration and/or extended configuration.

Figure 8:
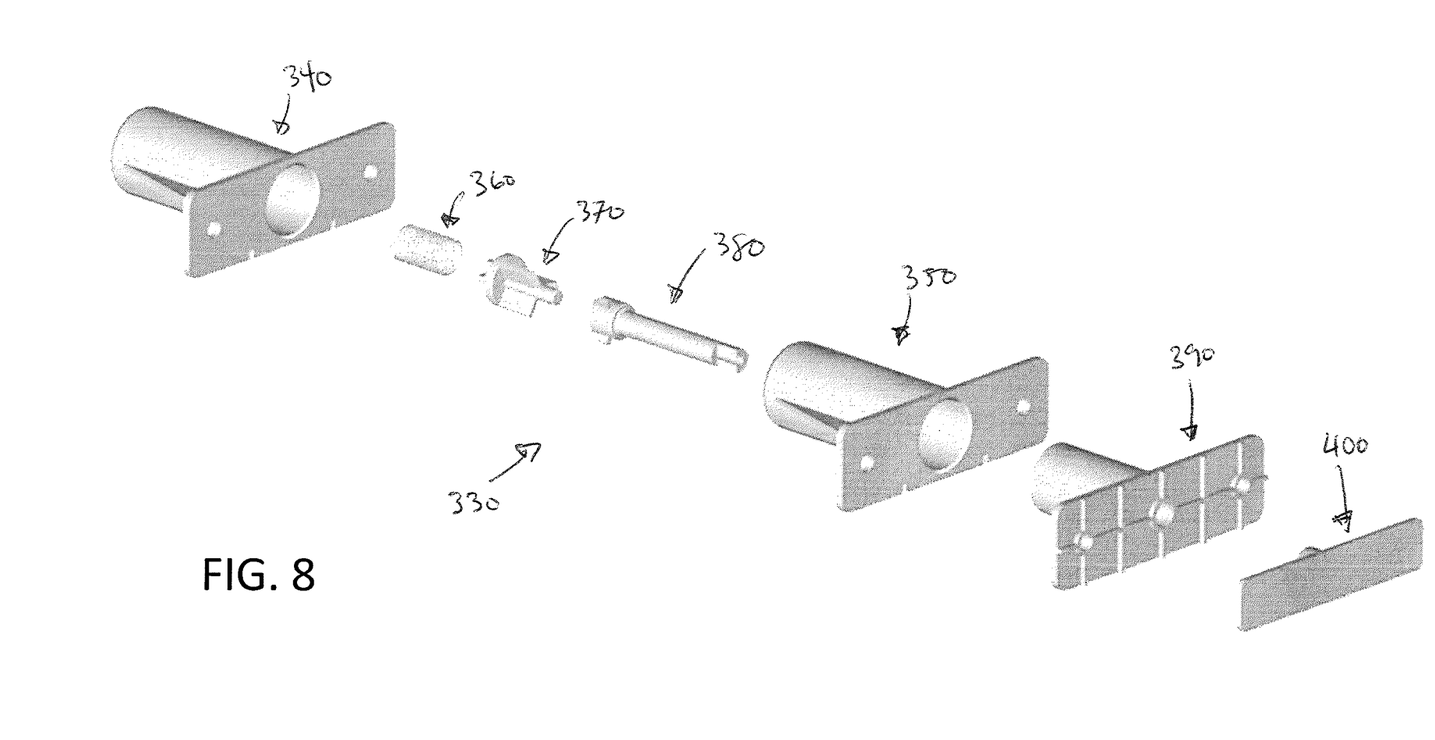
FIG. 8 is an exploded view of the eject mechanism shown in FIG. 7.

FIG. 8 shows the eject mechanism 330 including a first housing 340 and a second housing 350. The first housing 340 and second housing 350 are configured to house a biasing mechanism 360, a rotation pin 370, and/or a guide pin 380 on a distal side of the riser portion 309 of the upper wall 122 (e.g., inside the housing assembly 110). The biasing mechanism 360, rotation pin 370, and/or guide pin 380 may be configured to engage each other within a cavity defined by the first housing 340 and/or second housing 350 as the eject mechanism 330 is moved between the retracted configuration and the extended configuration. The rotation pin 370 and guide pin 380 may cooperate to control a movement of the guide pin 380. For example, the rotating mechanism 360 may rotate between a first position, in which the guide pin 380 is prevented or restricted from moving (e.g., from a retracted position), and a second position, in which the guide pin 380 is allowed to move (e.g., from the retracted position). In some examples, the first housing 340 and second housing 350 are coupled to each other using one or more coupling mechanisms. The coupling mechanisms may be extended, for example, through one or more openings defined in the first housing 340 and/or second housing 350. In some examples, the second housing 350 includes a base 390 positionable at the riser portion 309 of the upper wall 122.

The eject mechanism 330 includes a push mechanism 400 that is positionable on a proximal side of the riser portion 309 of the upper wall 122 (e.g., inside the slot 200). In some examples, the push mechanism 400 is coupled to the guide pin 380, which may be extended through the second housing 350, end wall 316, and/or end wall 326. The push mechanism 400 is moveable within the slot 200 between a retracted position, in which the push mechanism 400 is spaced a first distance from the riser portion 309 of the upper wall 122, and an extended position, in which the push mechanism 400 is spaced a second distance from the riser portion 309 of the upper wall 122 farther than the first distance. In this manner, at least a portion of the eject mechanism 330 is extendable into the slot 200 for at least partially ejecting the battery 202 from the slot 200.

In some examples, the push mechanism 400 is configured to remain stationary (e.g., until an external force is applied) when in the retracted position or in the extended position. When the push mechanism 400 is pushed or forced inward from the extended position (e.g., toward the riser portion 309 of the upper wall 122) beyond a predetermined position, the push mechanism 400 moves the guide pin 380 to engage the rotation pin 370 and urge the biasing mechanism 360 toward a biased position. Upon release (e.g., when the push mechanism 400 is no longer being pushed or forced inward), the biasing mechanism 360 moves toward a neutral position, moving the rotation pin 370 to engage the guide pin 380 and urge the push mechanism 400 outward (e.g., away from the riser portion 309 of the upper wall 122). With each cycle (e.g., push and release of the push mechanism 400), the rotation pin 370 may alternate between being rotated to the first position, in which the guide pin 380 is prevented or restricted from urging the push mechanism 400 to the extended position, and being rotated to the second position, in which the guide pin 380 is allowed to urge the push mechanism 400 to the extended position.

Figure 9:
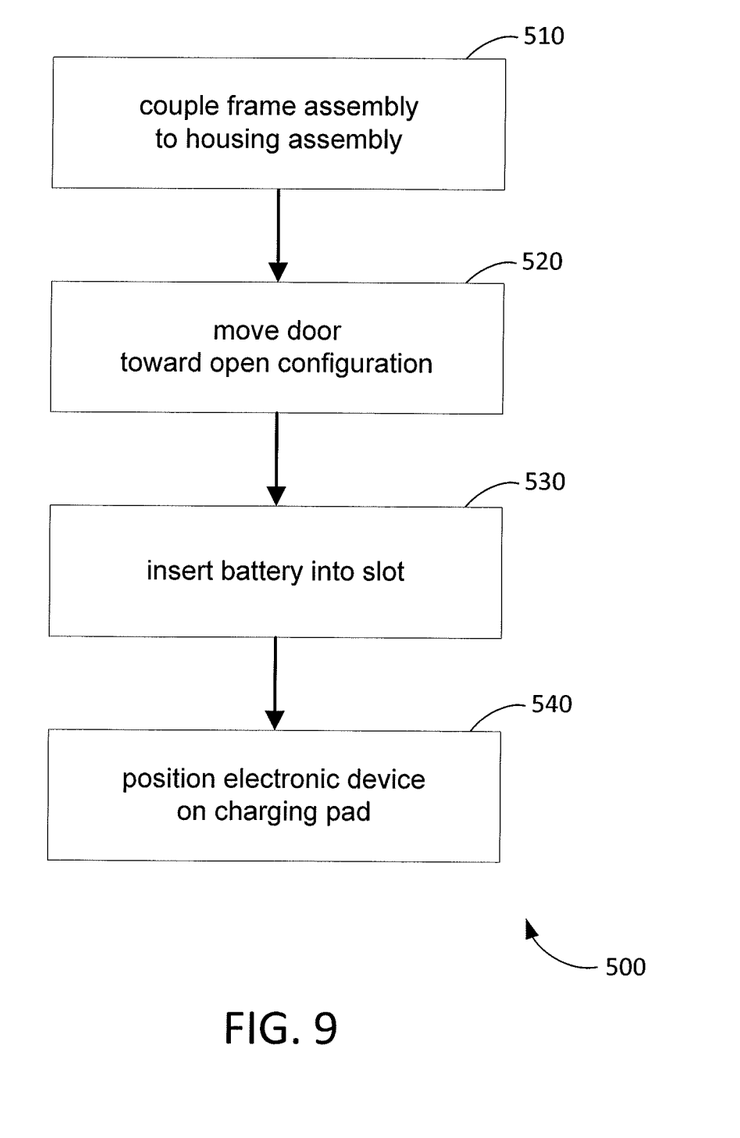
FIG. 9 is a flowchart of an example method of using a luggage system, such as the luggage system shown in FIG. 1.

FIG. 9 shows a method 500 of using a luggage system 100. The method 500 includes coupling a frame assembly 150 to a housing assembly 110 defining one or more luggage compartments therein at operation 510. In some examples, the frame assembly 150 includes a cover 210, a chassis 310, a support 320, and an eject mechanism 330. The frame assembly 150 defines a slot 200 therein, in which a battery 202 is insertable, and a charging pad thereon, upon which one or more electronic devices are positionable.

The frame assembly 150 may be positioned at or adjacent to a seat 300 defined at a first outer surface of a front shell 118 and/or rear shell 120 of the housing assembly 110. When the frame assembly 150 is coupled to the housing assembly 110, the charging pad faces an upward direction (e.g., a positive direction along the Y-axis) and the slot 200 extends in a horizontal direction (e.g., along the X-axis). In some examples, the luggage system 100 includes a trolley handle 180 coupled to the housing assembly 110 at a second outer surface (e.g., outer surface 214) of the front shell 118 and/or rear shell 120 spaced from the first outer surface. For example, as shown in FIG. 1, the frame assembly 150 may be coupled to the front shell 118, and the trolley handle 180 may be coupled to the rear shell 120.

To gain access to the slot 200 defined in the frame assembly 150, the door 220 of the cover 210 is moved toward the open configuration at operation 520. In some examples, a notch 222 and/or cutout 318 are defined at or adjacent to one end of the seat 300 to facilitate positioning a finger below the door 220 for moving the door 220 from the closed configuration.

A battery 202 is inserted into the slot 200 at operation 530. In some examples, the battery 202 is positionable entirely within the slot 200. For example, after pushing or forcing the battery 202 beyond a predetermined position, the moving portion 334 may move toward the retracted configuration, in which the battery 202 is allowed to be positioned entirely within the slot 200 (e.g., "push-to-insert"). The door 220 may move toward the closed configuration when the battery 202 is in the slot 200 to restrict access to the slot 200 and/or battery 202. An electronic device may be positioned at or adjacent to the outer surface 212 of the cover 210 at operation 540 to wirelessly charge the electronic device.

In some examples, the battery 202 is removed from the slot 200 (e.g., prior to delivering the luggage system 100 to a transportation provider for transporting the luggage system 100 in a hold of an aircraft or a baggage car of a train). For example, the door 220 may be moved toward the open configuration, the moving portion 334 may be moved toward the extended configuration by pushing or forcing the battery 202 beyond the predetermined position (e.g., "push-to-eject"), and the battery 202 may be pulled from the slot 200 ("pull-to-extract").

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various examples with their associated operations, a person skilled in the art would appreciate that a combination of operations from any number of different examples is also within the scope of the aspects of the disclosure.

What is claimed is:

1. A luggage system comprising:
    a housing assembly defining one or more luggage compartments therein, the housing assembly having a first outer surface that defines a seat;
    a frame assembly positionable at or adjacent to the seat to couple the frame assembly to the housing assembly, the frame assembly defining a slot therein and including an eject mechanism moveable in the slot between a retracted configuration and an extended configuration, the frame assembly having a frame surface that defines a charging pad, wherein the charging pad faces an upward direction when the frame assembly is coupled to the housing assembly; and
    a power bank insertable into the slot for wirelessly charging one or more electronic devices positioned at or adjacent to the charging pad, the eject mechanism configured to alternate between the retracted configuration and the extended configuration each time the power bank is pushed beyond a predetermined position in the slot.

2. The luggage system of claim 1, wherein the first outer surface defines a notch at an end of the seat, and wherein the frame assembly defines a cutout aligned with the notch at an end of the frame assembly.

3. The luggage system of claim 1, wherein the frame surface is knurled.

4. The luggage system of claim 1, wherein the frame surface is at an elevation that is the same as or substantially similar to an upper elevation of the housing assembly.

5. The luggage system of claim 1, wherein the frame assembly includes a cover extendable over the seat, wherein the cover defines the frame surface.

6. The luggage system of claim 1, wherein the frame assembly includes a chassis extendable over the seat and a cover extendable over the chassis, wherein the chassis includes a base wall, a side wall, and an end wall that define the slot, and the cover defines the frame surface.

7. The luggage system of claim 1, wherein the frame assembly includes a door moveable between a closed configuration, in which access to the slot is restricted, and an open configuration, in which access to the slot is allowed.

8. The luggage system of claim 1, wherein the frame assembly includes a support positionable under the seat.

9. The luggage system of claim 1, wherein the frame assembly is oriented such that the slot extends in a horizontal direction.

10. The luggage system of claim 1, wherein the eject mechanism is configured to at least partially eject the power bank from the slot when moving toward the extended configuration.

11. The luggage system of claim 1 further comprising one or more bands, wherein the housing assembly has one or more outer surfaces other than the first outer surface that define one or move grooves facing a direction generally perpendicular to the upward direction, the one or more bands extendable in the one or more grooves.

12. The luggage system of claim 1 further comprising a trolley handle coupled to a second outer surface of the housing assembly spaced from the first outer surface.

13. The luggage system of claim 1, wherein the eject mechanism includes a push mechanism configured to remain stationary in a retracted position until forced inward.

14. The luggage system of claim 1, wherein the eject mechanism includes a push mechanism configured to remain stationary in an extended position until forced inward.

15. The luggage system of claim 1, wherein the frame surface defines the charging pad such that the charging pad is parallel with the slot.

16. A frame assembly for use with a housing assembly, the frame assembly comprising:
    a chassis extendable over a seat defined at an upper surface of the housing assembly, the chassis including a base wall, a side wall, and an end wall that define a slot in which a power bank is positionable;
    an eject mechanism moveable in the slot between a retracted configuration and an extended configuration, the eject mechanism configured to alternate between the retracted configuration and the extended configuration each time the power bank is pushed beyond a predetermined position in the slot; and
    a cover extendable over the chassis, the cover having a frame surface defining a charging pad that faces an upward direction, wherein one or more electronic devices are positionable on the charging pad for wirelessly charging the one or more electronic devices.

17. The frame assembly of claim 16, wherein the frame surface is knurled and at an elevation that is the same as or substantially similar to an upper elevation of the housing assembly when the frame assembly is coupled to the housing assembly.

18. The frame assembly of claim 16, wherein the cover comprises a door moveable between a closed configuration, in which access to the slot is restricted, and an open configuration, in which access to the slot is allowed.

19. The frame assembly of claim 16, wherein the eject mechanism is configured to at least partially eject the power bank from the slot when moving toward the extended configuration.

20. A method of using a luggage system, the method comprising:
- coupling a frame assembly to a housing assembly defining one or more luggage compartments therein, the frame assembly including a cover that includes a door moveable between an open configuration and a closed configuration;
- moving the door toward the open configuration;
- pushing a battery to insert the battery into a slot defined in the frame assembly;
- positioning one or more electronic devices on a charging pad defined at an outer surface of the cover for wirelessly charging the one or more electronic devices; and
- pushing the battery to at least partially eject the power bank from the slot defined in the frame assembly.

* * * * *